(12) United States Patent
Touma et al.

(10) Patent No.: US 11,097,530 B2
(45) Date of Patent: Aug. 24, 2021

(54) THREE-DIMENSIONAL MODELING DEVICE AND THREE-DIMENSIONAL MODELING METHOD

(71) Applicants: MUTOH INDUSTRIES LTD., Tokyo (JP); HOSEI UNIVERSITY, Tokyo (JP)

(72) Inventors: Takashi Touma, Tokyo (JP); Chiaki Tanuma, Tokyo (JP)

(73) Assignees: Mutoh Industries Ltd., Tokyo (JP); Hosei University, Tokyo (JP)

( * ) Notice: Subject to any disclaimer, the term of this patent is extended or adjusted under 35 U.S.C. 154(b) by 954 days.

(21) Appl. No.: 15/574,086

(22) PCT Filed: Feb. 27, 2017

(86) PCT No.: PCT/JP2017/007407
§ 371 (c)(1),
(2) Date: Nov. 14, 2017

(87) PCT Pub. No.: WO2018/154767
PCT Pub. Date: Aug. 30, 2018

(65) Prior Publication Data
US 2020/0156363 A1 May 21, 2020

(51) Int. Cl.
*B33Y 50/02* (2015.01)
*B29C 64/386* (2017.01)
(Continued)

(52) U.S. Cl.
CPC ............ *B33Y 50/02* (2014.12); *B29C 64/112* (2017.08); *B29C 64/386* (2017.08); *G06T 19/20* (2013.01); *B33Y 10/00* (2014.12); *B33Y 30/00* (2014.12)

(58) Field of Classification Search
CPC ......... B33Y 50/02; B33Y 10/00; B33Y 30/00; B33Y 50/00; B29C 64/112; B29C 64/386;
(Continued)

(56) References Cited

U.S. PATENT DOCUMENTS

| 5,838,360 A | 11/1998 | Harrold et al. |
| 6,757,582 B2 * | 6/2004 | Brisson .................. A61B 90/10 |
| | | 700/186 |

(Continued)

FOREIGN PATENT DOCUMENTS

| JP | 07199381 A | 8/1995 |
| JP | 2011141705 A | 7/2011 |

(Continued)

OTHER PUBLICATIONS

International Search Report and English translation of International Search Report issued in International Application No. PCT/JP2017/007407 dated Mar. 28, 2017.

*Primary Examiner* — Charles R Kasenge
(74) *Attorney, Agent, or Firm* — Hoffmann & Baron, LLP

(57) ABSTRACT

The three-dimensional modeling device includes a three-dimensional data acquisition unit that acquires three-dimensional data representing a three-dimensional structure with voxels, a discharge mechanism that discharges a laminated material including a plurality of kinds of dyes, and a control unit that controls the discharge mechanism based on the three-dimensional data so as to model the three-dimensional model. One of the voxels is divided into a plurality of elements in each of intersecting three directions, each of the plurality of the elements is provided with color data corresponding to one of a plurality of colors, and the color data of the element is determined such that all of a plurality of surfaces of the voxel has an approximately identical color.

8 Claims, 7 Drawing Sheets

(51) Int. Cl.
*B29C 64/112* (2017.01)
*G06T 19/20* (2011.01)
*B33Y 10/00* (2015.01)
*B33Y 30/00* (2015.01)

(58) Field of Classification Search
CPC ..... B29C 64/268; B29C 64/153; B29C 67/00; G06T 19/20; G06T 2219/2012; G06T 2200/04
See application file for complete search history.

(56) References Cited

U.S. PATENT DOCUMENTS

| | | | |
|---|---|---|---|
| 9,600,929 B1* | 3/2017 | Young | G06T 1/60 |
| 2012/0320425 A1 | 12/2012 | Yoshida | |
| 2016/0001505 A1* | 1/2016 | Hakkaku | B29C 64/393 |
| | | | 264/255 |
| 2016/0082654 A1* | 3/2016 | Hakkaku | B29C 35/0805 |
| | | | 264/308 |
| 2016/0236410 A1* | 8/2016 | Ohnishi | B29C 64/393 |
| 2018/0033160 A1* | 2/2018 | Ishigami | G06T 7/73 |

FOREIGN PATENT DOCUMENTS

| | | |
|---|---|---|
| JP | 2016007736 A | 1/2016 |
| JP | 2016221789 A | 12/2016 |

* cited by examiner

THREE-DIMENSIONAL MODELING DEVICE AND THREE-DIMENSIONAL MODELING METHOD

CROSS-REFERENCE TO RELATED APPLICATIONS

This application is the U.S. National Phase of International Patent Application No. PCT/JP2017/007407, filed Feb. 27, 2017, the contents of which are incorporated herein by reference in its entirety.

BACKGROUND

Technical Field

The present invention relates to a three-dimensional modeling device and a three-dimensional modeling method.

Related Art

In conventional 3D printers, a color 3D printer configured to color a surface shape has been proposed already in, for example, Patent Literature 1. However, the conventional color 3D printer is configured to only color a surface of a modeled three-dimensional model based on polygon data and similar data, and it has been difficult to color an inside of the three-dimensional model with a color truly reproducing a color of an original three-dimensional structure. The reason is that three-dimensional CAD data used for the modeling includes only data on the surface of the three-dimensional model not defining an internal structure of the three-dimensional model, and does not include color data of the internal structure. In view of this, a three-dimensional modeling device configured to precisely color even the inside of the three-dimensional model is required

CITATION LIST

Patent Literature

Patent Literature 1: JP 2016-221789 A

SUMMARY

Technical Problem

It is an object of the present invention to provide a three-dimensional modeling device configured to precisely color even an inside of a three-dimensional model and a three-dimensional modeling method.

Solution to Problem

A three-dimensional modeling method according to the present invention includes acquiring three-dimensional data representing a three-dimensional structure with a plurality of voxels, dividing a voxel of the plurality of voxels into a plurality of elements in each of intersecting three directions, and providing color data corresponding to one of a plurality of colors to each of the plurality of elements, wherein providing the color data to the plurality of elements is performed such that a plurality of surfaces of the voxel has an approximately identical color.

A three-dimensional modeling device according to the present invention includes a three-dimensional data acquisition unit that acquires three-dimensional data representing a three-dimensional structure with a plurality of voxels, a discharge mechanism that discharges a laminated material including a plurality of kinds of dyes, and a control unit that controls the discharge mechanism based on the three-dimensional data so as to model the three-dimensional model. A voxel of the plurality of voxels is divided into a plurality of elements in each of intersecting three directions, each element of the plurality of elements is provided with color data corresponding to one of a plurality of colors, and the color data of each element is determined such that all of a plurality of surfaces of the voxel has an approximately identical color.

A three-dimensional modeling device according to another aspect of the present invention includes a three-dimensional data acquisition unit that acquires three-dimensional data representing a three-dimensional structure with a plurality of voxels, a discharge mechanism that discharges a laminated material including a plurality of kinds of dyes, and a control unit that controls the discharge mechanism based on the three-dimensional data so as to model a three-dimensional model, wherein a voxel of the plurality of voxels is divided into a plurality of elements in each of intersecting three directions, each element of the plurality of elements is provided with color data corresponding to one of a plurality of colors, the plurality of the elements included in the voxel have exposed elements that appear on one surface of the voxel, and core elements that are covered with the exposed elements, and the control unit further provides color data for color correction to the core elements.

DETAILED DESCRIPTION

Next, embodiments of the present invention will be described in detail with reference to the drawings. While the following description employs an inkjet-type 3D printer as an example, the present invention is not limited to the inkjet type, and the 3D printer is simply configured to discharge laminated material that includes a plurality of kinds of dyes by each element described later.

Figure 1:
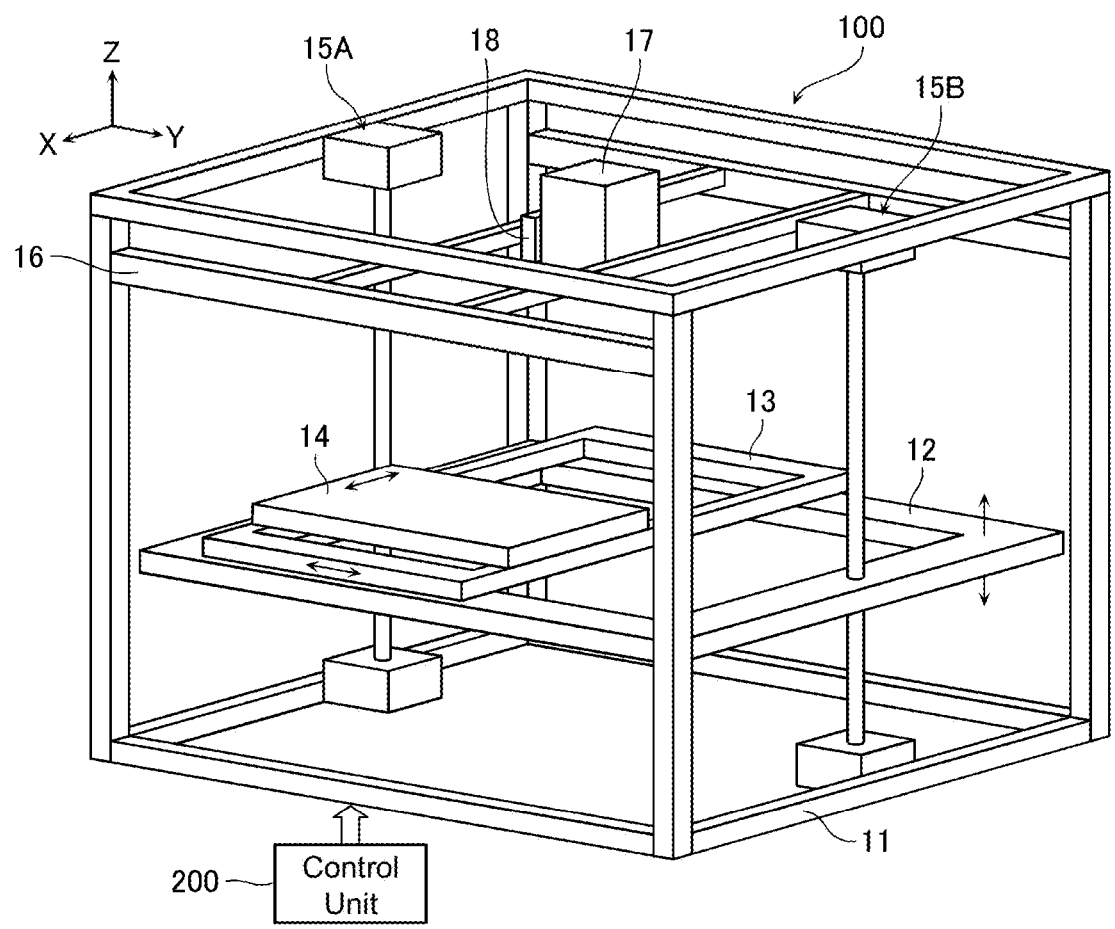
FIG. 1 is a schematic perspective view illustrating an overall configuration of a 3D printer 100 of a first embodiment.

FIG. 1 is a schematic perspective view illustrating an overall configuration of a 3D printer 100 of a first embodiment. The 3D printer 100 includes a frame 11, a Z-gantry 12, a Y-gantry 13, a modeling table 14, elevating devices 15A and 15B, a head holding portion 16, an ink tank 17, and an inkjet head 18.

The frame 11 has a framework in a rectangular shape and internally houses the Z-gantry 12 and other parts described later. The Z-gantry 12 is configured to be moved inside the frame 11 by the elevating devices 15A and 15B in a Z-direction (a direction approximately perpendicular to a principal plane of the modeling table 14) in FIG. 1.

The Y-gantry 13 is configured to slide on a surface of the Z-gantry 12 along a Y-direction (a direction parallel to the principal plane of the modeling table 14) in FIG. 1. The modeling table 14 is configured to slide on a surface of the Y-gantry 13 in an X-direction (a direction parallel to the principal plane of the modeling table 14 and a direction perpendicular to the Y-direction) in FIG. 1. The above-described operations of the Z-gantry 12, the Y-gantry 13, and the modeling table 14 allows a three-dimensional model formed on the modeling table 14 to move in three directions of the X-direction, the Y-direction, and the Z-direction. The three-dimensional model on the modeling table 14 relatively moving in a three-dimensional direction with respect to the inkjet head 18 ensures modeling the three-dimensional model based on three-dimensional data.

The head holding portion 16 is securely disposed on the frame 11 at a position higher than at least a maximum height of the Z-gantry 12. The ink tank 17 and the inkjet head 18 are held on the head holding portion 16. The ink tank 17 holds a plurality of kinds of inks, for example, C (cyan), M (magenta), Y (yellow), and white (W) for color modeling of the three-dimensional model. Then, the inkjet head 18 injects the inks to form voxels as constituent units (three-dimensional pixels) of the three-dimensional model. As the ink, an ultraviolet ray curing type ink that is hardened by irradiating an ultraviolet ray can be used. In this case, an ultraviolet ray irradiation unit (not illustrated) may be disposed beside the inkjet head 18.

Figure 2:
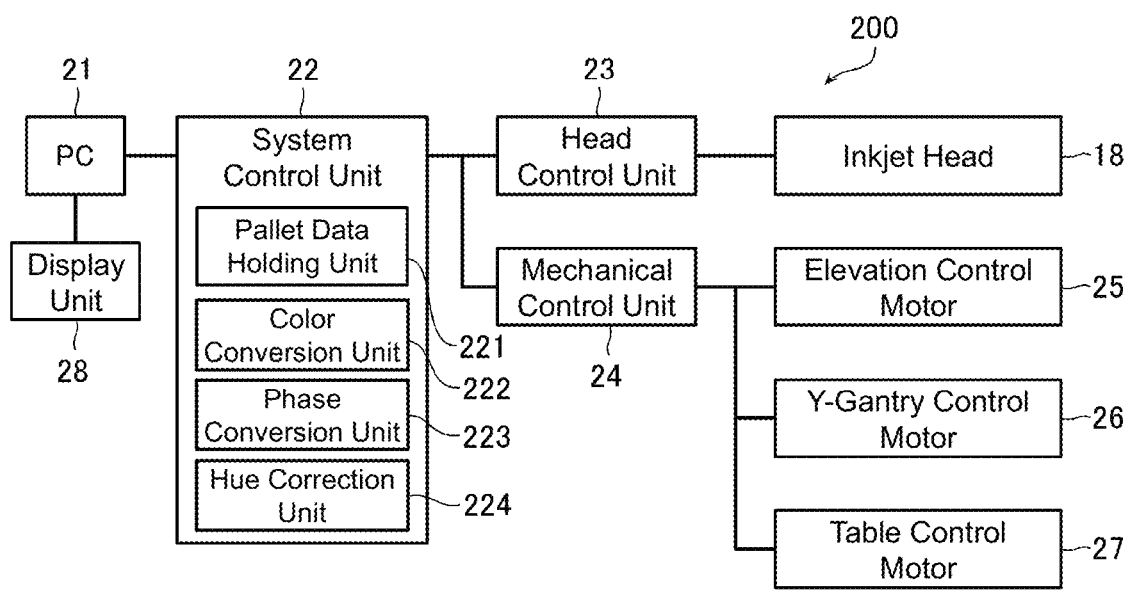
FIG. 2 is a block diagram illustrating a configuration of a control unit 200 that controls the 3D printer 100 in FIG. 1.

FIG. 2 is a block diagram illustrating a configuration of a control unit 200 that controls the 3D printer 100 in FIG. 1. The control unit 200 includes a computer 21, a system control unit 22, a head control unit 23, a mechanical control unit 24, an elevation control motor 25, a Y-gantry control motor 26, a table control motor 27, and a display unit 28.

The computer 21 functions as a three-dimensional data acquisition unit that acquires, from outside, three-dimensional data of the three-dimensional model to be modeled, and executes conversion of various data and similar operation necessary for modeling. The three-dimensional data has a basic element (three-dimensional pixel) of a voxel having a width in the three-dimensional direction as one unit, and is represented by a set of the voxels. That is, a plurality of voxels is three-dimensionally disposed to constitute the three-dimensional data. Each voxel can include various information, for example, color information such as RGB and CMKY, information on material constituting the voxel. This will be described later.

The system control unit 22 has a function to generate head control data for controlling the inkjet head 18 and motor control data for controlling the various kinds of motors based on the three-dimensional data, and transfers the data to the head control unit 23 and the mechanical control unit 24. The system control unit 22 includes a pallet data holding unit 221, a color conversion unit 222, a phase conversion unit 223, and a hue correction unit 224.

The pallet data holding unit 221 holds pallet data as color data. The color conversion unit 222 has a function to convert color data held by the voxel into the pallet data corresponding to the color data. The phase conversion unit 223 has a function to convert the phase of the voxel based on the pallet data provided to the voxel. The hue correction unit 224 has a function to correct a hue of the pallet data provided to the voxel based on various data.

The head control unit 23 controls the type of the ink discharged from the inkjet head 18 and the discharge amount based on the received head control data. The mechanical control unit 24 further divides the motor control data into Z-direction data, Y-direction data, and X-direction data, and transfers these data to the elevation control motor 25, the Y-gantry control motor 26, and the table control motor 27, respectively. The elevation control motor 25, the Y-gantry control motor 26, and the table control motor 27 drive the Z-gantry 12, the Y-gantry 13, and the modeling table 14 based on the Z-direction data, the Y-direction data, and the X-direction data. The display unit 28 is constituted of, for example, a liquid crystal display.

Next, a description will be given of the three-dimensional data represented by the voxel. In a conventional 3D printer, an STL format is typically used for representing a three-dimensional shape by exploding into plane data in a horizontal direction. The STL format has no method for representing properties of the inside of the structure. Accordingly, in constituting the three-dimensional model based on the STL format, it is difficult to represent an internal structure of the three-dimensional structure, and coloring can be performed only on the surface.

As an example, in forming a model of a heart in a model of a human body by a 3D printer, it is required to model a structure of an inside of the heart including the color. However, it is difficult for the conventional 3D printer that employs the STL format.

Figure 3:
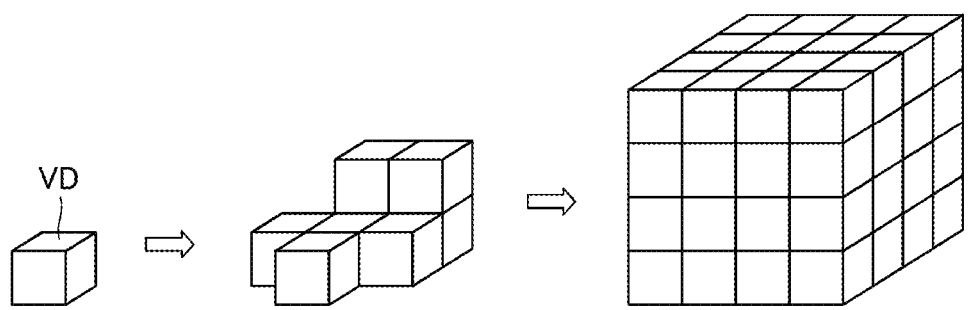
FIG. 3 is a schematic diagram illustrating a concept of three-dimensional data (voxel) used in the embodiment.

In contrast, as illustrated in FIG. 3, the 3D printer according to the embodiment represents the structure of the three-dimensional model by the set of the voxels VD each of which constitutes one unit of the three-dimensional structure. The case of the voxel VD facilitates representing the internal structure of the three-dimensional structure, and each of the voxels VD is provided with the color data, thus facilitating the representation of the color of the inside of the three-dimensional structure. As a format handling the voxel, there has been already known FAV (FAbricatable Voxel) format, and the FAV format is applicable to the embodiment.

Figure 4:
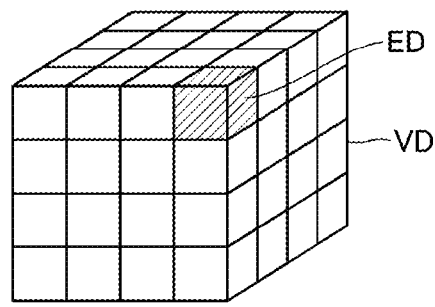
FIG. 4 is a conceptual diagram illustrating three-dimensional data using voxels VD.

As illustrated in FIG. 4, one voxel VD is further divided into a plurality of elements ED in each direction of intersecting three directions (X/Y/Z). As an example, one voxel VD is divided into multiple, for example, four elements ED in each of the X-direction, the Y-direction, and the Z-direction, so as to be divided into 4×4×4=64 pieces.

Figure 5:
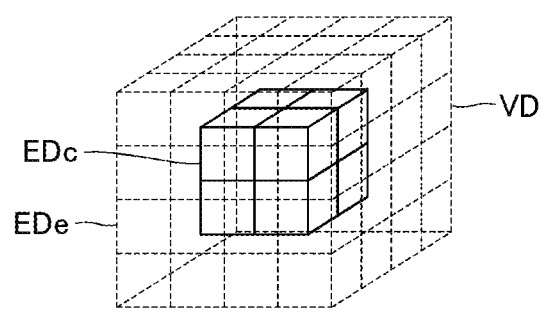
FIG. 5 illustrates a relation between the voxel VD and elements ED.

A size of one voxel VD is determined depending on a minimum discharge amount of the inkjet head 18. For example, when the minimum discharge amount of the inkjet head 18 is 16 pl (pico liter), the 16 pl is a minimum size of one element ED. Accordingly, when the element ED is a cube, a minimum value of one side of one element ED is approximately 25 μm. When a viewable size (resolution) at an observation distance of the three-dimensional model is 0.1 mm, four elements ED having one side of 25 μm are collected in each direction of the X-direction, the Y-direction, and the Z-direction, 4×4×4=64 pieces in total, so as to form one voxel VD. As illustrated in FIG. 5, the 64 elements ED in the one voxel VD can be classified into 56 exposed elements EDe that appear on the surfaces of the voxel VD and core elements EDc that have peripheral areas covered with the exposed elements EDe so as to be buried inside the voxel VD to be unseen from outside. The exposed elements EDe are allowed to be provided with the color data other than white. On the other hand, the core elements EDc are basically provided with data of white except a case where a hue correction is performed on the voxel.

In one voxel VD, it is not necessary that division numbers (the numbers of the elements) in the X-direction, the Y-direction, and the Z-direction be identical. For example, one voxel may be constituted of the elements of 4×6×8 pieces. While being not capable of approximating as a cube, one element ED may have an oblate shape in the Z-direction or similar direction compared with the cube. In this case, the number of arrays of the element in one voxel VD may be different in the Z-direction, the Y-direction, and the X-direction such that the voxel VD has a cube shape.

Each element ED is provided with one piece of the color data among a plurality of kinds of the color data (for example, white (W), cyan (C), M (magenta), Y (yellow)) based on the pallet data assigned in accordance with the color data (for example, any of six colors of achromatic colors and respective four colors of R, G, B, C, M, and Y, 30 colors in total) to be provided to the voxel VD. That is, for providing one piece of color data to one of six surfaces of the voxel VD, one piece of the color data among white (W), cyan (C), M (magenta), and Y (yellow) is provided to the 16 (4×4) elements ED appearing on the one surface. Combinations of the color data (W, C, M, and Y) provided to the 16 elements ED determine the color data provided to one surface of the voxel.

In providing the color data to the elements ED appearing on the six surfaces of the voxel VD in such way, it is necessary to provide an approximately identical color to the six surfaces of the voxel VD. In view of this, in the embodiment, the color data of the elements ED is determined such that all the six surfaces have the approximately identical color in the voxel VD. This will be described in detail using FIG. 6.

The above example indicates the type of color of the ink in the case where the inkjet type 3D printer in FIG. 1 is used. The 3D printer in FIG. 1 performs ultraviolet ray curing on the ink itself to laminate the elements ED and further the voxels VD so as to make the three-dimensional model, thus needing a white ink. In contrast, in the case of the other type printers, for example, that discharge dyes of the ink and similar material on a white laminated material, a plurality of inks may be only, for example, C, M, and Y, and white is not necessary to be included.

Figure 6:
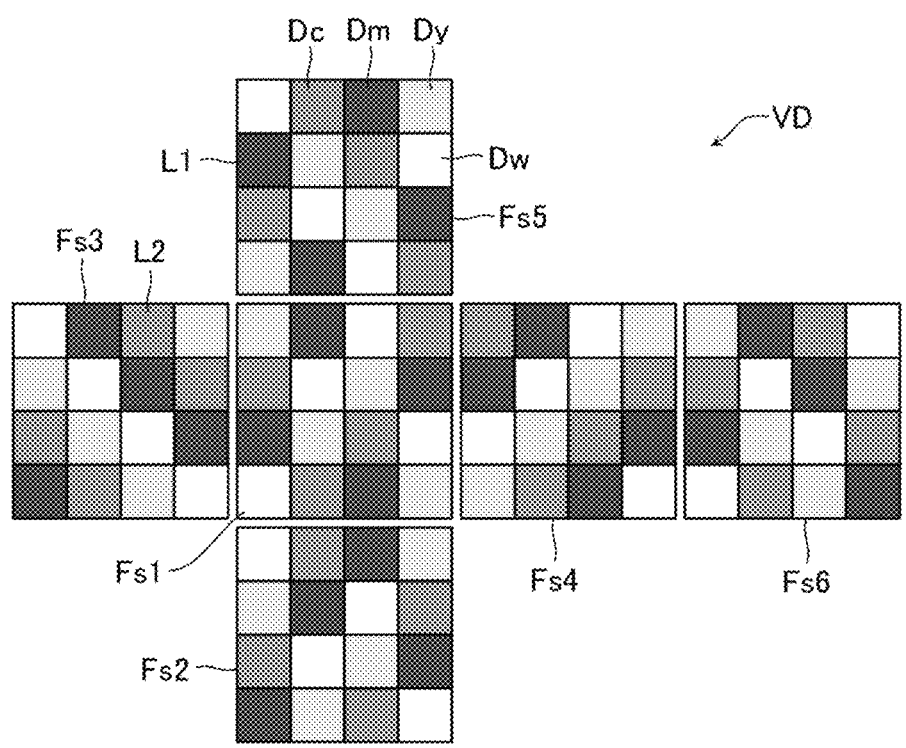
FIG. 6 illustrates color data (pallet data) provided to the voxel VD.

FIG. 6 is a development diagram of one voxel VD. The voxel VD has six faces Fs1 to Fs6. For example, the face Fs5 faces the face Fs3 at a side indicated by reference numerals L1 and L2 in FIG. 6. In FIG. 6, the element ED provided with white (W) as the color data is indicated by a reference numeral Dw. Similarly, the elements ED provided with cyan (C), M (magenta), and Y (yellow) are represented by reference numerals Dc, Dm, and Dy, respectively. Thus, data that indicates the color data assigned to the plurality of the elements ED included in one voxel VD is the above-described pallet data. The pallet data is held by the pallet data holding unit 221, and the pallet data matching the color is read out from the pallet data holding unit 221, for example, in accordance with the type of the color (for example, any one of six colors of achromatic colors and respective four colors of R, G, B, C, M, and Y, 30 colors in total) to be provided to the voxel VD. When the pallet data is read out, the color data is provided to each element based on the pallet data.

FIG. 6 indicates distribution of the color data to each element ED in the case where a gray color is provided to the voxel VD. For providing an identical color to the six faces Fs1 to Fs6 of the voxel VD, proportions of the elements provided with the reference numerals Dw, Dc, Dm, and Dy in the respective faces are approximately identical.

Figure 7:
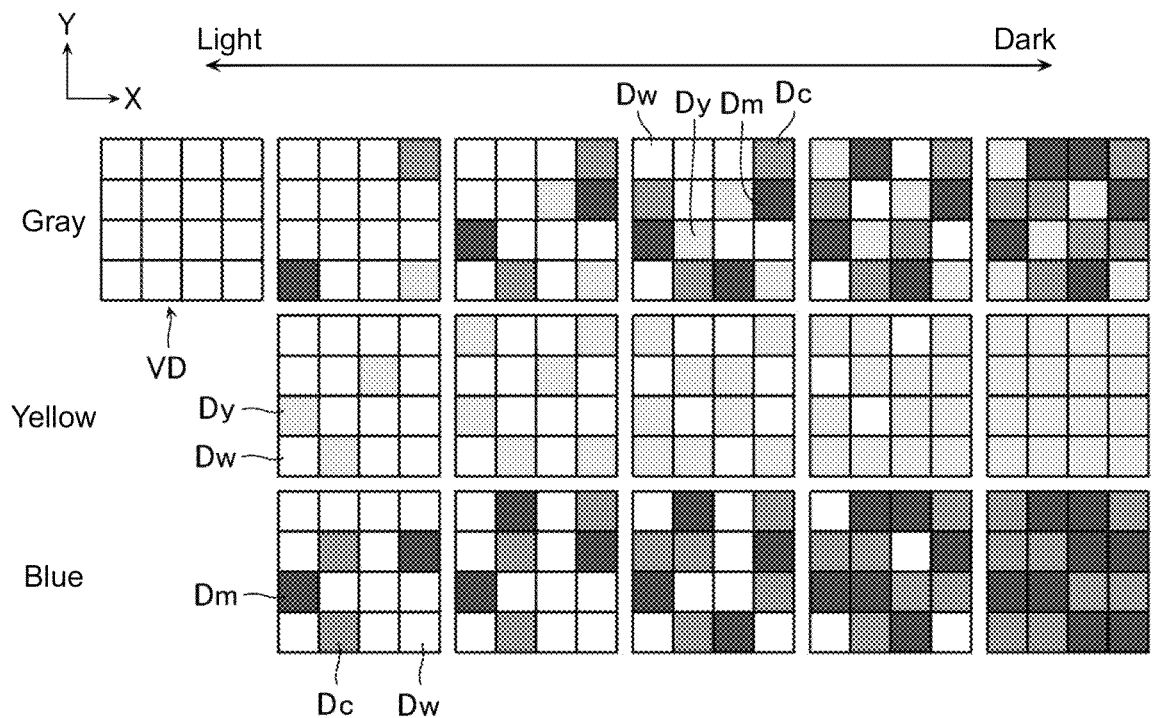
FIG. 7 illustrates color data (shade) provided to the voxel VD.

As illustrated in FIG. 7, when gray is provided to the voxel VD, as a sum of the number of the elements ED of the reference numerals Dc, Dm, and Dy on one surface of the voxel VD increases compared with the number of the elements of the reference numeral Dw, the color of the surface of the voxel VD becomes more dark gray. When yellow is provided to the voxel VD, any of the elements ED of the reference numerals Dw and Dy is provided, and as the number of the elements ED of the reference numeral Dy on one surface increases compared with the number of the elements of the reference numeral Dw, the yellow provided to the voxel VD becomes dark yellow. Similarly, when blue is provided to the voxel VD, any of the elements ED of the reference numerals Dy Dm, and Dw is provided, and as the numbers of the elements ED of the reference numerals Dy and Dm on one surface increase compared with the number of the elements ED of the reference numeral Dw, the blue provided to the voxel VD becomes dark blue.

The elements ED provided with the colors corresponding to the reference numerals Dy, Dm, and Dc are the exposed elements EDe illustrated in FIG. 5, and the core elements EDc may be basically the elements ED of the reference numeral Dw because the core elements EDc are not exposed to the outside. However, when the hue correction is required, the color data other than the reference numeral Dw is sometimes provided. This will be described later.

While the examples illustrated in FIG. 6 and FIG. 7 employ an arrangement (a point drawing style) where the elements ED having the identical color are not adjacent in the X-direction and the Y-direction as much as possible so as to be adjacent only in an oblique direction on one surface, the arrangement of the elements ED is not limited to this, and a layout (a line drawing style) where two elements ED having the identical color are allowed to share a side (in other words, adjacent in the X-direction and the Y-direction may be employed.

When a plurality of the voxels VD provided with the identical color is disposed along one surface, moire occurs in some cases so as to possibly provide a color shade different from the original three-dimensional structure. Then, in the embodiment, for preventing the occurrence of the moire, the above-described phase conversion unit 223 is used to perform the following controls.

Figure 8:
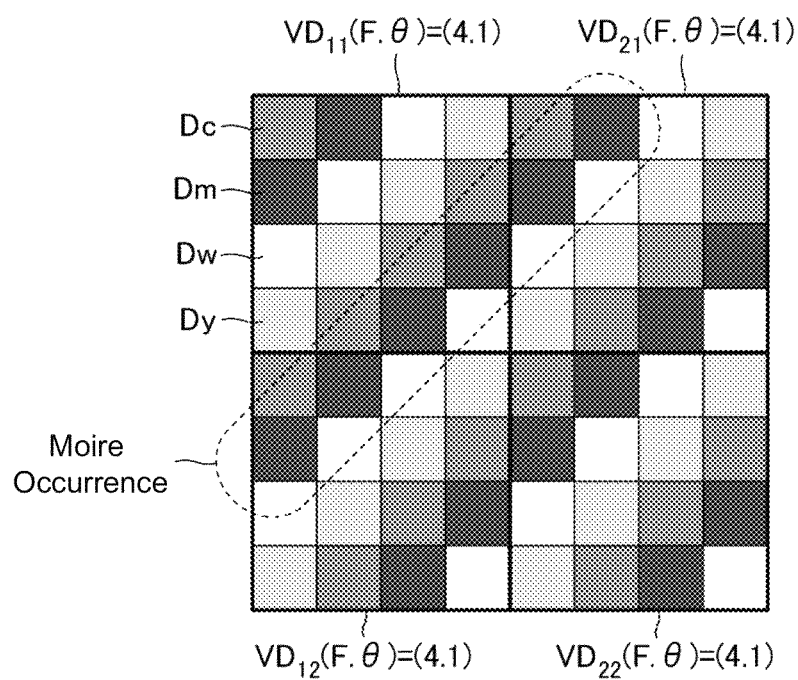
FIG. 8 is a conceptual diagram describing an operation of a phase conversion unit 223 for preventing occurrence of a moire.

For example, as illustrated in FIG. 8, assume that, on one surface, a plurality of (for example, four pieces) voxels $VD_{11}$, $VD_{12}$, $VD_{21}$, and $VD_{22}$ having an identical color (an identical color number) are aligned in a grid pattern (2×2) on the identical surface. Then, the four voxels $VD_{11}$, $VD_{12}$, $VD_{21}$, and $VD_{22}$, to which the identical color is provided, each have the face Fs4 illustrated in FIG. 6 facing the identical surface side. In FIG. 8, the last numbers of the faces Fs1 to fs6 are assumed to be face numbers F, and the faces Fs1 to Fs6 have rotation angles (0° (1), 90° (2), 180° (3), and 270° (4)) with respect to a reference position as a face angle θ.

In this case, as illustrated in FIG. 8, a plurality of the elements ED having the identical color, for example, the reference numeral Dm, are sometimes arranged in a straight line, and this possibly causes the moire on the surface. However, in the first embodiment, for preventing the occurrence of the moire, a control is performed as necessary to rotate the voxel VD, thus preventing the occurrence of the moire. FIG. 8 indicates an exemplary case where the elements of the reference numeral Dm are arranged in an oblique direction so as to cause the moire. However, the occurrence of the moire is not limited to the case where the elements having the identical color are arranged in the oblique direction, and the moire possibly occurs in the case where the elements having the identical color are arranged with a predetermined regularity. For example, the moire possibly occurs even in the case where the elements having the identical color are arranged in a direction parallel to the side of the voxel. Even in such case, similar operation can be performed.

This will be described in detail with reference to FIG. 9. When the plurality of the voxels $VD_{11}$, $VD_{12}$, $VD_{21}$, and $VD_{22}$ as illustrated in FIG. 8 are generated, the phase conversion unit 223 rotates (converts the phases of) the voxels $VD_{11}$, $VD_{12}$, $VD_{21}$, or $VD_{22}$, thus preventing the elements ED having the identical color from being arranged in the straight line.

Figure 9:
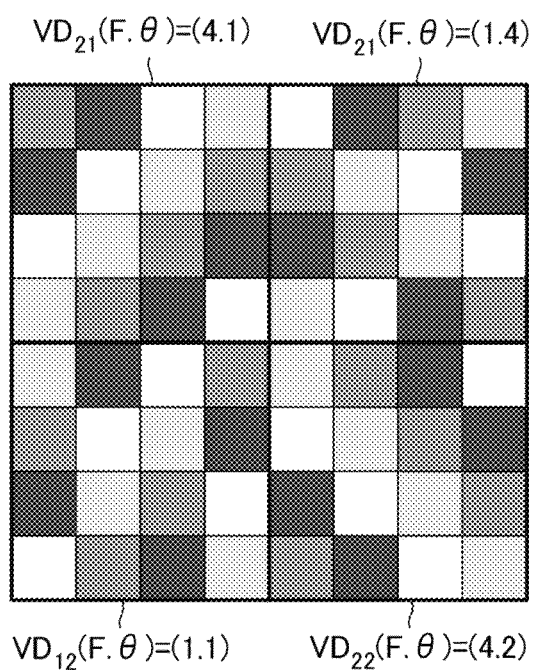
FIG. 9 is a conceptual diagram describing the operation of the phase conversion unit 223 for preventing the occurrence of the moire.

FIG. 9 illustrates a state where the voxels in the arrangement as FIG. 8 where the moire occurs have been rotated to be changed in an arrangement of the elements where the moire does not occur. When the arrangement where the moire occurs is provided, the phase conversion unit 223 rotates, for example, the voxels $VD_{12}$ and $VD_{21}$ so as to cause the faces Fs1 to appear on a paper surface side instead of the faces Fs4. In FIG. 9, specifically, on the voxel $VD_{12}$, (F, θ)=(4, 1) is converted into (F, θ)=(1, 2). On the voxel $VD_{21}$, (F, θ)=(4, 1) is converted into (1, 4).

On the voxel $VD_{22}$, while the face Fs4 stays facing the paper surface side, the face Fs4 is rotated to left by 90° (2) ((f, θ)=(4, 2)).

The above-described rotation of the voxel allows a choice of the arrangement where the elements having the identical color are not arranged in a row, thus preventing the occurrence of the moire. The above example employs a manner where, for preventing the moire, any of or both the face number f of the voxel VD and the rotation angle θ are changed. However, the present invention is not limited to this, and a manner where any one of the F and the θ is fixed and only the other is changed may be employed as far as the prevention of the moire is achievable.

The rotating operation by the phase conversion unit 223 is preferably performed such that, when the system control unit 22 detects the arranged voxels VD having the identical color, the rotation control is automatically performed so as to provide the arrangement to avoid the occurrence of the moire. Alternatively, the rotating operation by the phase conversion unit 223 may be performed such that the system control unit 22 automatically detects the above-described arrangement of the elements ED having the identical color so as to perform the rotation control to release the arrangement.

Alternatively, instead of this, it is allowed that, for example, the display unit 28 displays the arrangement of the voxels VD, and an operator determines the indication of the display unit 28 and instructs the rotation of the voxel via an input unit (a computer mouse, a keyboard, and similar unit) of the computer 21.

The examples illustrated in FIG. 8 and FIG. 9 indicate the cases where, among the four voxels VD arranged in the grid pattern, the voxels having the identical color are arranged. However, this is merely an example, and the phase conversion unit 223 may be configured to perform in the case where the voxels having the identical color are adjacent in a unit of two adjacent voxels.

Next, with reference to FIG. 10, a description will be given of a distribution of the color data to the core element EDc by the hue conversion unit 224. As described above, since the core element EDc is not seen from outside, the color data assigned provided to the core element EDcy may be white (W) (the reference numeral Dw).

However, because of various reasons, a desired hue is not obtained in some cases depending on only the color data provided to the exposed element EDe. For example, it is expected that providing the color data of white (W), cyan (C), magenta (M), and yellow (Y) to each element ED of the voxel VD theoretically ensures providing the desired hue to the voxel VD. However, an evaluation of the respective colors on actual hue in color spaces of L*, a*, and b* indicates that the actual hue is displaced from the theoretical hue. In this case, an operation for the color correction is necessary.

Since the used inks often have predetermined transparency, the color shade of the core element EDc possibly influences on the color shade of the entire voxel VD.

In view of this, in the embodiment, while the core element EDc is basically provided with white (W), in the case where the color correction is necessary, the core element EDc may be provided with any of cyan (C), magenta (M), and yellow (Y). This ensures the correction of the hue of the voxel VD.

Figure 10:
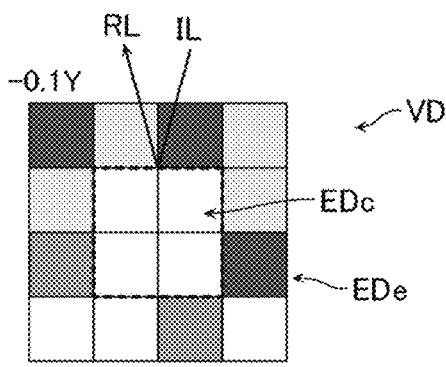
FIG. 10 is a conceptual diagram describing an operation of a hue conversion unit 223.
Figure 10:
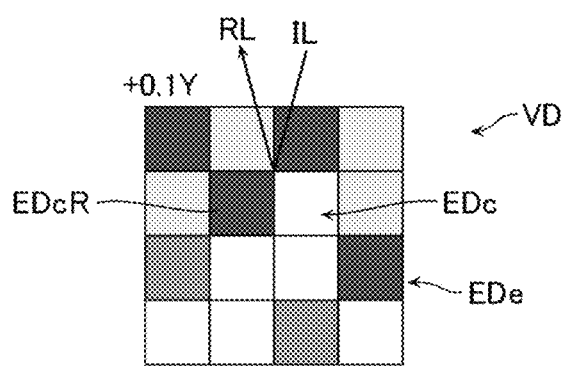

For example, as illustrated in a top of FIG. 10, assume that every core element EDc is white. An incident light IL enters into the element of the reference numeral Dm of the voxel VD to become a reflected light RL of red (R), and the reflected light RL passes through the element ED of the reference numeral Dy toward the outside. At this time, a color degree of the element of the reference numeral Dm biased to a Y-side sometimes causes the reflected light RL to be a yellowish color.

In such case, for example, as illustrated in a lower side of FIG. 10, the hue conversion unit 224 is allowed to change the color data provided to an EDcR as one of the core elements EDc from white (W) to the other color, for example, magenta (M). This ensures correcting the reflected light RL to a color closer to the original red.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

REFERENCE SIGNS LIST 100 3D printer
200 Control unit
11 Frame
12 Z-gantry
13 Y-gantry
14 Modeling table
15A, 15B Elevating device
16 Head holding portion
17 Ink tank
18 Inkjet head
21 Computer
22 System control unit
23 Head control unit
24 Mechanical control unit
25 Elevation control motor 26 Y-gantry control motor
27 Table control motor
28 Display unit
VD Voxel
ED Element

The invention claimed is:

1. A three-dimensional modeling method comprising:
acquiring three-dimensional data representing a three-dimensional structure with a plurality of voxels;
dividing a voxel of the plurality of voxels into a plurality of elements in each of intersecting three directions;
providing color data corresponding to one of a plurality of colors to each of the plurality of elements, wherein the plurality of the elements included in the voxel have exposed elements that appear on one surface of the voxel, and core elements that are covered with the exposed elements; and
providing color data for color correction to the core elements,
wherein providing the color data to the plurality of elements is performed such that a plurality of surfaces of the voxel has an approximately identical color.

2. The three-dimensional modeling method according to claim 1, the method further comprising rotating the voxel.

3. The three-dimensional modeling device according to claim 2, wherein rotating the voxel is executed when the plurality of voxels having an identical color are arranged side by side.

4. A three-dimensional modeling device comprising:
a three-dimensional data acquisition unit that acquires three-dimensional data representing a three-dimensional structure with a plurality of voxels;
a discharge mechanism that discharges a laminated material including a plurality of kinds of dyes; and
a control unit that controls the discharge mechanism based on the three-dimensional data so as to model a three-dimensional model,
wherein a voxel of the plurality of voxels is divided into a plurality of elements in each of intersecting three directions,
each element of the plurality of elements is provided with color data corresponding to one of a plurality of colors, wherein the plurality of the elements included in the voxel have exposed elements that appear on one surface of the voxel, and core elements that are covered with the exposed elements,
the color data of each element is determined such that a plurality of surfaces of the voxel has an approximately identical color, and
the control unit further provides the core elements with color data for color correction.

5. The three-dimensional modeling device according to claim 4, wherein the control unit performs a control to rotate the voxel.

6. The three-dimensional modeling device according to claim 5, wherein the control unit performs the control to rotate the voxel when the plurality of voxels having an identical color are arranged side by side.

7. A three-dimensional modeling device comprising:
a three-dimensional data acquisition unit that acquires three-dimensional data representing a three-dimensional structure with a plurality of voxels;
a discharge mechanism that discharges a laminated material including a plurality of kinds of dyes; and
a control unit that controls the discharge mechanism based on the three-dimensional data so as to model a three-dimensional model,
wherein a voxel of the plurality of voxels is divided into a plurality of elements in each of intersecting three directions,
each element of the plurality of elements is provided with color data corresponding to one of a plurality of colors,
the plurality of the elements included in the voxel have exposed elements that appear on one surface of the voxel, and core elements that are covered with the exposed elements, and
the control unit further provides color data for color correction to the core elements.

8. The three-dimensional modeling device according to claim 7, wherein when the color correction is not necessary, the control unit keeps the core element in white.

* * * * *